Nov. 27, 1934.   F. G. LOGAN   1,982,007
ELECTRIC CONTROLLING APPARATUS
Filed Sept. 11, 1931
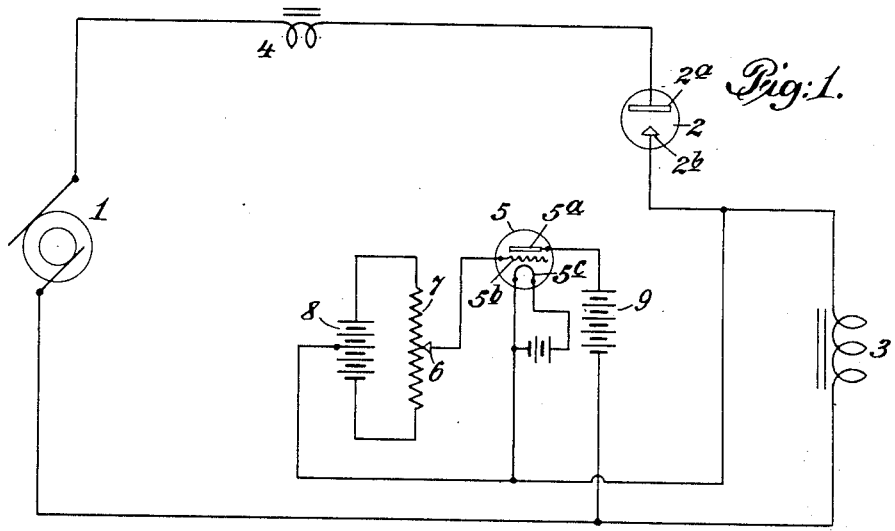
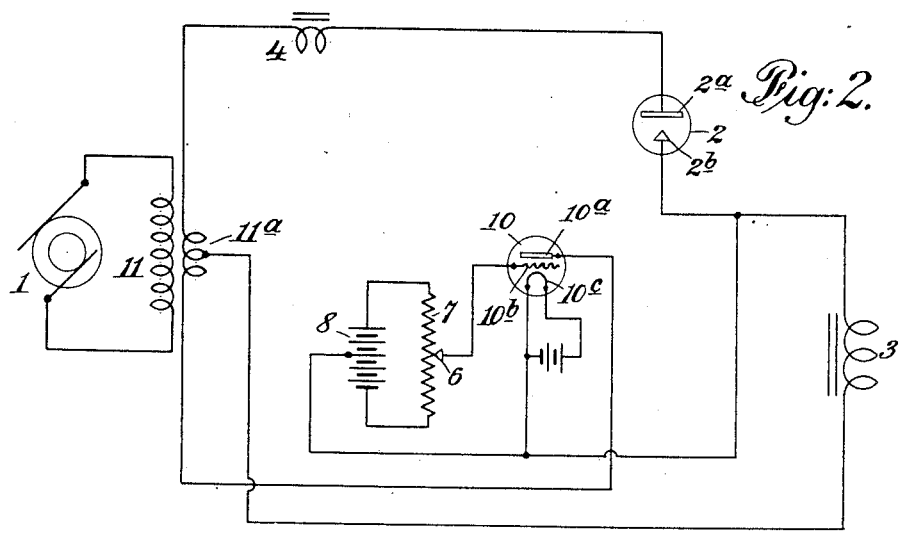
INVENTOR
Frank G. Logan
BY Lawrence K. Sager
his ATTORNEY Patented Nov. 27, 1934

1,982,007

UNITED STATES PATENT OFFICE 1,982,007

ELECTRIC CONTROLLING APPARATUS

Frank G. Logan, Mount Vernon, N. Y., assignor to Ward Leonard Electric Company, a corporation of New York Application September 11, 1931, Serial No. 562,226

12 Claims. (Cl. 175—363)

This invention particularly relates to the control of the voltage and current supplied to a consumption circuit having an inductive load and where the source of current is alternating and the consumption circuit receives a uni-directional current.

The main object of the invention is to provide an improved method and apparatus for widely varying the range of the voltage and current in the consumption circuit. Another object is to secure this control with a high degree of efficiency and reduce the loss of energy to a comparatively small amount throughout the range of control. Another object is to provide apparatus which will occupy a comparatively small amount of space. Another object is to accomplish the control by use of a comparatively small amount of control energy with reference to the energy controlled and to permit convenient location of the controlling device at any desired point remote from the main apparatus. Another object is to permit the use of apparatus which is dependable and durable in long continued operation and requires but little attention from the operator. Other objects and advantages will be understood by those skilled in the art from the following description and accompanying drawing.

Fig. 1 is a diagram illustrating one embodiment of the invention; and Fig. 2 is a diagram showing another embodiment.

When a half wave rectifier is used to supply uni-directional current to an inductive circuit, or an inductive load, the current through the inductive circuit or load is limited by the inductance. If the inductance is relatively high, the current will be relatively low and may even be zero. When it is desired to adjust the current flowing in the inductive circuit or inductive load, it is customary to make the load low in inductance so the current flowing is the highest desired, and then lower it by a rheostat or some other well known means. But, in many cases this inductance cannot be made low and is sometimes very high. However, if some means be provided for maintaining the current in the consumption circuit during the half wave when the rectifier is not active, then a larger current may be caused to flow in the inductive circuit. By the present invention, I provide auxiliary means for imposing upon the consumption circuit a supply of current which will cause the current to be maintained therein and also control this supply of current for the purpose of controlling the voltage and current supplied to the consumption circuit. When a comparatively small amount of control energy is supplied, the current and voltage in the consumption circuit is at a minimum and may be made quite low. When the supply of control energy is increased, the voltage and current of the consumption circuit may be very greatly increased; and the wide range of control obtained in the consumption circuit may be accomplished by a comparatively small amount of change in the control energy.

In Fig. 1 a source of alternating current 1 supplies energy to a half wave rectifier 2, represented by a two element rectifier having an anode 2a and a cathode 2b. The rectifier supplies current to the load 3 which is an inductive load and, for best results, should be highly inductive. The path from the load returns to the other side of the source 1. An inductance 4 may be used in series in the circuit to the rectifier when needed.

For the purpose of controlling the supplemental energy supplied to the consumption circuit, a three element vacuum tube 5 is shown having the plate 5a, grid 5b and the filament 5c. For the purpose of varying the grid potential, an adjustable contact 6 is moved over a resistance 7, which has its terminals connected to a battery 8. One terminal of the filament is shown connected to a mid point of this battery. The plate circuit contains a source of direct current energy shown as a battery 9 having one terminal connected to the plate 5a, the other terminal connected to one side of the load 3. A terminal of the filament is connected to the other side of the load 3, so that the plate circuit is connected across the load.

In operation, the rectifier supplies the main energy to the consumption circuit and the direct current source 9 of the plate circuit supplies the auxiliary controlling energy. When the contact 6 is adjusted to make the potential of the grid 5b quite negative with respect to the cathode 5c, a minimum amount of current will flow in the plate circuit and this small amount of energy so supplied to the load results in a comparatively small current being supplied to the load from the rectifier 2 and the main source of energy 1. As the contact 6 is adjusted to cause the grid potential to be less negative with respect to the cathode, more current is supplied to the load from the plate circuit and causes a much greater proportional amount of energy to be supplied by the rectifier 2 to the consumption circuit. The result is that when the grid potential is adjusted between limits, the voltage and current supplied to the load varies from a very small amount to a very high limit. In general, the wide range of control is due to the fact that as the flux density of the core of the load 3 increases and approaches saturation by increase of current supplied thereto, the consumption circuit becomes less and less reactive and permits the passage of more and more current from the rectifier 2, the proportional increase in consumption current being in a much greater ratio than the increase of flux density and the amount of control energy supplied.

The load 3, instead of being an inductive device utilizing the consumption energy for its own purpose alone, may be an inductive controlling device cooperating with some other apparatus, such as the direct current exciting portion of a reactor supplied with alternating current for the purpose of varying the voltage and current of a consumption circuit such as when used as a dimmer for controlling a lamp load.

In Fig. 2 instead of providing an independent source of control energy, this energy is derived from the alternating current source and supplied through a rectifier which is adapted to vary the control energy within the required limits. A three element rectifier 10 is indicated, having a plate 10a, grid 10b and cathode 10c. The potential of the grid is varied by adjustment of the contact 6 over the resistance 7 connected around the battery 8, as in Fig. 1. A transformer is provided having its primary 11 connected to the source 1 and its secondary 11a supplying energy to the apparatus. One terminal of this secondary passes to the anode 2a of the half wave rectifier 2 and thence through the cathode 2b to the load 3, the circuit returning to a mid-point of the secondary 11a. The plate circuit of the controlling energy passes from one side of the load to the cathode 10c, plate 10a and then back to the other terminal of the transformer 11a. The plate circuit is thus connected across the load to one-half of the transformer 11a which supplies the energy to the rectifier 10, which in turn permits a uni-directional current to be supplied to the load when the half wave rectifier 2 is non-active in supplying energy to the load. Variation of the grid potential will cause the rectified controlling energy to vary as desired for the purpose of securing the desired wide variation of voltage and current of the consumption circuit in the manner described with reference to Fig. 1.

Although I have described certain particular embodiments of this invention, it will be understood that various modifications may be made therein and that other forms of apparatus may be used than those particularly referred to, without departing from the scope of this invention.

I claim:

1. The combination of a source of alternating current energy, a half-wave rectifier for supplying energy therefrom to an inductive circuit, means for supplying auxiliary uni-directional controlling energy to said circuit comprising a device having a plate, grid and filament, and means for varying the potential of said grid for controlling the voltage of said auxiliary energy for controlling the energy supplied by said rectifier.

2. The combination of a source of alternating current energy, a half-wave rectifier for supplying energy therefrom to an inductive circuit, an auxiliary source of direct current energy for supplying controlling energy to said circuit, a device having a plate, grid and filament for controlling the energy supplied from said auxiliary source, and means for varying the potential of said grid for varying the voltage of the auxiliary energy supplied to said circuit.

3. The combination of a source of alternating current energy, a half-wave rectifier for supplying energy therefrom to an inductive circuit, an auxiliary rectifier for supplying controlling energy to said circuit from said source during the half-waves when said first rectifier is inactive, and means for varying the voltage delivered by said auxiliary rectifier for controlling the energy supplied by said first rectifier.

4. The combination of a source of alternating current energy, a half-wave rectifier for supplying energy therefrom to an inductive circuit, an auxiliary rectifier for supplying controlling energy to said circuit from said source during the half-waves when said first rectifier is inactive, said auxiliary rectifier comprising a plate, grid and filament, and means for varying the voltage delivered by said auxiliary rectifier for controlling the energy supplied by said first rectifier.

5. The combination of a source of alternating current energy, a half-wave rectifier for supplying energy therefrom to an inductive circuit, an auxiliary rectifier for supplying controlling energy to said circuit from said source during the half-waves when said first rectifier is inactive, said auxiliary rectifier comprising a plate, grid and filament, and means for varying the potential of said grid for controlling the energy supplied by said rectifier.

6. The combination of a source of alternating current energy, a half-wave rectifier for supplying uni-directional current therefrom to an inductive circuit, and means for supplying controlling current to said circuit when said rectifier is not active and in the same direction therethrough as the current from said rectifier.

7. The combination of a source of alternating current energy, a half-wave rectifier for supplying uni-directional current therefrom to an inductive circuit and means for supplying controlling current to said circuit when said rectifier is not active and in the same direction therethrough as the current from said rectifier and for varying the amount of said controlling current for controlling the energy supplied by said rectifier to said circuit.

8. The combination of a source of alternating current energy, a half-wave rectifier for supplying uni-directional energy therefrom to an inductive circuit, and means for supplying controlling energy to said circuit when said rectifier is not active and in the same direction to said circuit as the energy from said rectifier and for varying the voltage of the controlling energy for controlling the energy supplied by said rectifier to said circuit.

9. The combination of a source of alternating current energy, a half-wave rectifier for supplying uni-directional current therefrom to an inductive circuit, and means for supplying auxiliary uni-directional controlling current to said circuit when said rectifier is not active and in the same direction through said circuit as the current from said rectifier and for controlling the voltage of the auxiliary energy for controlling the energy supplied by said rectifier to said circuit.

10. The combination of a source of alternating current energy, a rectifier for supplying uni-directional current therefrom to an inductive circuit intermittently, and means for supplying controlling current to said circuit intermittently when said rectifier is not active and in the same direction therethrough as the current from said rectifier.

11. The combination of a source of alternating current energy, a rectifier for supplying unidirectional current therefrom to an inductive circuit intermittently, and means for supplying controlling current to said circuit intermittently when said rectifier is not active and in the same direction therethrough as the current from said rectifier and for varying the amount of said controlling current for controlling the energy supplied by said rectifier.

12. The combination of a source of alternating current energy, a rectifier for supplying unidirectional current therefrom to an inductive circuit intermittently, and means for supplying controlling current to said circuit intermittently when said rectifier is not active and in the same direction therethrough as the current from said rectifier and for varying the voltage of the controlling energy for controlling the energy supplied by said rectifier.

FRANK G. LOGAN.